United States Patent
Sakazaki (10) Patent No.: US 8,583,369 B2
(45) Date of Patent: Nov. 12, 2013

(54) ELECTRONIC APPARATUS AND METHOD FOR SPECIFYING A PRESENT LOCATION OF THE ELECTRONIC APPARATUS

(75) Inventor: Naoyuki Sakazaki, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 13/435,975

(22) Filed: Mar. 30, 2012

(65) Prior Publication Data

US 2012/0253667 A1 Oct. 4, 2012

(30) Foreign Application Priority Data

Mar. 30, 2011 (JP) ................................ 2011-074152

(51) Int. Cl.
*G01C 21/00* (2006.01)
*G08G 1/09* (2006.01)

(52) U.S. Cl.
USPC .......................................... 701/461; 340/905

(58) Field of Classification Search
USPC .................. 701/400–541; 340/988–996, 905; 715/781
See application file for complete search history.

(56) References Cited

U.S. PATENT DOCUMENTS

| | | |
|---|---|---|
| 2007/0063897 A1 | 3/2007 | Matsuda |
| 2009/0143936 A1* | 6/2009 | Craig .............................. 701/37 |
| 2010/0114472 A1* | 5/2010 | Oumi ............................ 701/200 |

FOREIGN PATENT DOCUMENTS

| | | |
|---|---|---|
| JP | 2005-012939 A | 1/2005 |
| JP | 2009-225097 A | 10/2009 |

\* cited by examiner

*Primary Examiner* — James Trammell
*Assistant Examiner* — Muhammad Shafi
(74) *Attorney, Agent, or Firm* — Holtz, Holtz, Goodman & Chick, PC (57) ABSTRACT

An electronic apparatus is provided with a user-data storing unit 4 and a radio signal receiving unit 6-11. The user-data storing unit stores plural pieces of usage-environment information in combination respectively with plural pieces of place (location) information, wherein the usage-environment information represents an environment under which the electronic apparatus is used at a place (location) and the place information combined with the usage-environment information indicates the place (location) where the electronic apparatus is used. The radio signal receiving unit obtains present usage-environment information representing an environment, under which the apparatus is used at present. A controlling unit 2 judges a similarity of each piece of usage-environment information stored in the user-data storing unit to the present usage-environment information, and obtains the place (location) information stored in combination with the usage-environment information having the maximum similarity as place (location) information indicating the present place (location).

20 Claims, 4 Drawing Sheets

Table 101:

| | PLACE NAME | LATITUDE, LONGITUDE | ENVIRONMENT INFORMATION | | | | ACTION PATTERN | TIME |
|---|---|---|---|---|---|---|---|---|
| | | | TEMPERATURE | HUMIDITY | PRESSURE | RECEIVED WAVE | | |
| 1 | | | | | | | | |
| 2 | ⋮ | ⋮ | ⋮ | ⋮ | ⋮ | ⋮ | ⋮ | ⋮ |
| 3 | ⋮ | ⋮ | | | | | | |
| 4 | ⋮ | ⋮ | ⋮ | ⋮ | ⋮ | ⋮ | ⋮ | ⋮ |
| ⋯ | ⋯ | ⋯ | ⋯ | ⋯ | ⋯ | ⋯ | ⋯ | ⋯ |

FIG. 2B

Table 102:

| DATE, TIME | LATITUDE, LONGITUDE | PLACE NAME |
|---|---|---|
| | | |
| ⋮ | ⋮ | ⋮ |
| ⋮ | ⋮ | |
| ⋮ | ⋮ | ⋮ |
| ⋯ | ⋯ | ⋯ |

ELECTRONIC APPARATUS AND METHOD FOR SPECIFYING A PRESENT LOCATION OF THE ELECTRONIC APPARATUS

BACKGROUND OF THE INVENTION

1. Field of the Invention

The present invention relates to an electronic apparatus and a method for specifying a place of a moving body.

2. Description of the Related Art

A technique for calculating a place with use of GPS (Global Positioning System) is widely used as a technique for specifying a place, to which a moving body moves, in navigation apparatuses for vehicle installation or in cellular phones. But the technique with use of GPS has a disadvantage that it needs to receive electro-magnetic waves transmitted from at least three GPS satellites to calculate the place, to which the moving body moves. A technique to solve the above disadvantage is proposed in the following Patent Document 1. In the technique, a signal is exchanged between two separate radio stations whose geographical locations are known, whereby a geographical location of a moving body is measured.

Patent Document 1: International Publication No. 2005/012939

But even in the technique disclosed in Patent Document 1, since it is essential to receive an electro-magnetic wave from the radio station to calculate the geographical location of a moving body, it is hard for the technique to calculate the location in a basement or in an office building where the electro-magnetic wave cannot be received. The technique disclosed in Patent Document 1 has also a disadvantage that, while the moving body stays in the basement or in the office building, the location of the moving body cannot be measured.

SUMMARY OF THE INVENTION

According to one aspect of the present invention, there is provided an electronic apparatus, which comprises a storing unit for storing plural pieces of usage-environment information in combination respectively with plural pieces of place information (location information), wherein the plural pieces of usage-environment information represent environments under which the electronic apparatus is used at different places (locations), respectively and the plural pieces of place information indicate the different places (locations) where the electronic apparatus is used, respectively; an environment-information obtaining unit for obtaining present usage-environment information representing an environment under which the electronic apparatus is used at present; a similarity judging unit for judging a similarity of each piece of usage-environment information stored in the storing unit to the present usage-environment information obtained by the environment-information obtaining unit, thereby selecting usage-environment information having a higher similarity from among the plural pieces of usage-environment information stored in the storing unit; and a place-information obtaining unit (location-information obtaining unit) for obtaining from among the plural pieces of place information stored in the storing unit, specific place information (location information) combined with the usage-environment information having a higher similarity, selected by the similarity judging unit as place information indicating a place (location) where the electronic apparatus is used at present.

According to another aspect of the invention, there is provided a place (location) specifying method in an electronic apparatus having a storing unit, the method which comprises a storing step of storing in the storing unit plural pieces of usage-environment information in combination respectively with plural pieces of place information (location information), wherein the plural pieces of usage-environment information represent environments under which the electronic apparatus is used at different places (locations), respectively and the plural pieces of place information indicate the different places (locations) where the electronic apparatus is used, respectively; an environment-information on obtaining step of obtaining present usage-environment information representing an environment under which the electronic apparatus is used at present; a similarity judging step of judging a similarity of each piece of usage-environment information stored in the storing unit to the present usage-environment information obtained at the environment-information obtaining step, thereby selecting usage-environment information having a higher similarity from among the plural pieces of usage-environment information stored in the storing unit; and a place-information (location-information) obtaining step of obtaining from among the plural pieces of place information (location information) stored in the storing unit, specific place information (location information) combined with the usage-environment information having a higher similarity, selected at the similarity judging step as place information (location information) indicating a place (location) where the electronic apparatus is used at present.

According to still another aspect of the invention, there is provided a computer readable recording medium to be mounted on an electronic apparatus, wherein the electronic apparatus is provided with a computer for controlling the whole operation of the electronic apparatus, a storing unit, and the recording medium storing a program, the program, when executed by the computer, to make the computer implement a method for specifying a place, wherein the method comprises storing in the storing unit plural pieces of usage-environment information combined respectively with plural pieces of place information (location information), wherein the plural pieces of usage-environment information represent environments under which the electronic apparatus is used at different places (locations), respectively and the plural pieces of place information indicate the different places (locations) where the electronic apparatus is used, respectively; obtaining present usage-environment information representing an environment under which the electronic apparatus is used at present; judging a similarity of each piece of usage-environment information stored in the storing unit to the present usage-environment information obtained by the environment-information obtaining unit, thereby selecting usage-environment information having a higher similarity from among the plural pieces of usage-environment information stored in the storing unit; and obtaining from among the plural pieces of place information (location information) stored in the storing unit, specific place information (location information) combined with the usage-environment information having a higher similarity, selected by the similarity judging unit as place information (location information) indicating a place (location) where the electronic apparatus is used at present.

BRIEF DESCRIPTION OF THE INVENTION

DETAILED DESCRIPTION OF THE PREFERRED EMBODIMENTS

Figure 1:
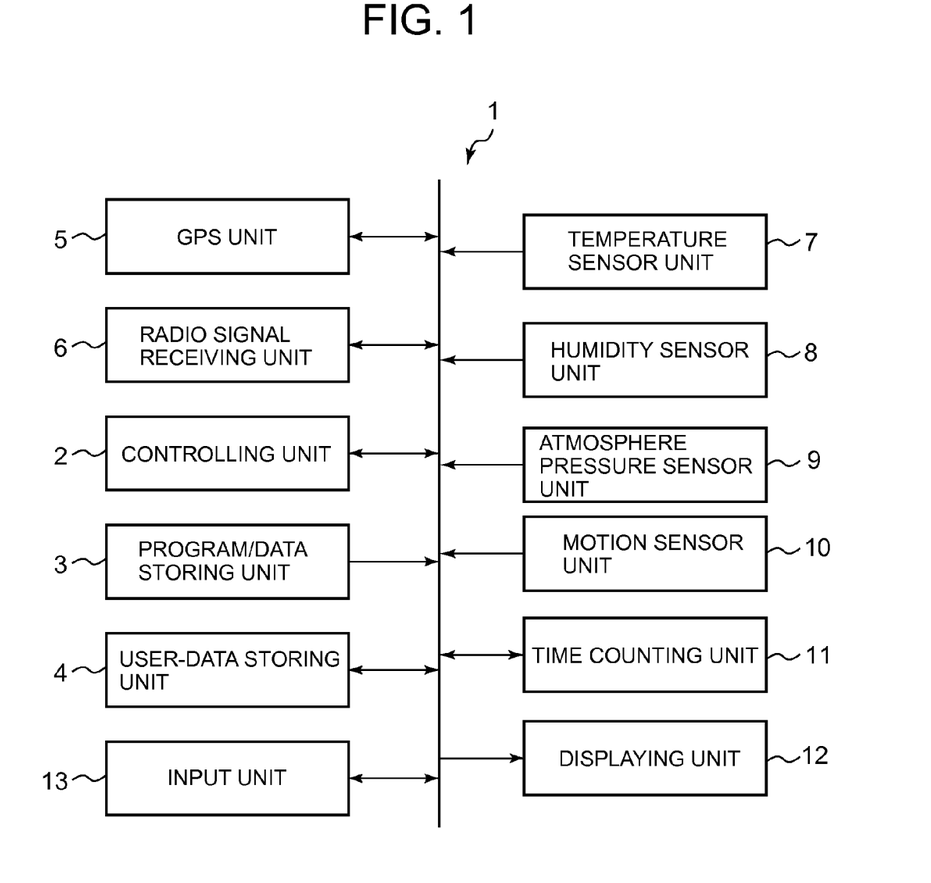
FIG. 1 is a block diagram of an action history recording apparatus, which has a function of an electronic device for specifying a place (location) where the present apparatus is used.

Now, embodiments of the present invention will be described with reference to the accompanying drawings in detail. FIG. 1 is a block diagram of an action history recording apparatus, which has a function of an electronic device for specifying a place (location) where the present apparatus is used. A user can bring with him or her the action history recording apparatus 1 according to the embodiment of the invention. When the user moves, who brings the action history recording apparatus 1 with him or her, the apparatus 1 records when (time) the user moved and where (place, location) the user stayed as an action history (movement history or daily-life history) of the user.

As shown in FIG. 1, the action history recording apparatus 1 comprises a controlling unit 2, a program/data storing unit 3, a user-data storing unit 4, GPS unit 5, a radio signal receiving unit 6, a temperature sensor unit 7, a humidity sensor unit 8, an atmosphere pressure sensor unit 9, a motion sensor unit 10, a time counting unit 11, displaying unit 12 and an input unit 13.

Further, the controlling unit 2 comprises CPU (Central Processing Unit), a peripheral circuit of CPU, and a work memory such as RAM (Random Access Memory). The controlling unit 2 controls the whole operation of the action history recording apparatus 1.

GPS unit 5 calculates a present position of the action history recording apparatus 1 with use of the well known GPS (Global Positioning System). GPS unit 5 consists mainly of an antenna for receiving electro-magnetic waves transmitted from plural GPS satellites, an operational circuit for calculating the present position based on the received electro-magnetic waves, a memory for storing satellite information necessary for catching the satellites and geodetic data essential for calculating the present position, and a time counting circuit for calculating a timing of catching the satellites.

Position information obtained by GPS unit 5 is the absolute three-dimensional position information, which consists of a latitude, a longitude and an altitude. GPS unit supplies the controlling unit 2 with the position information and positioning data including accuracy information for indicating a positioning accuracy. The positioning accuracy indicates an accuracy of the calculated present position, which mainly varies depending on the number of GPS satellites that are caught when the present position is calculated.

The radio signal receiving unit 6 receives the electro-magnetic wave, which is used in a radio communication of a specific system. The radio signal receiving unit 6 consists mainly of the antenna, a receiving unit for receiving the electro-magnetic wave through the antenna, and a demodulating unit for demodulating a receiving signal.

The electro-magnetic wave, which the radio signal receiving unit 6 receives is an electro-magnetic wave in a frequency band of 2.4 GHz, which is used for the radio LAN communication in conformity with IEEE 8.02.11 standard and Bluetooth (Registered Trademark) communication in conformity with IEEE 802.15.1 standard. The radio signal receiving unit 6 demodulates the received signal and supplies the demodulated signal (digital signal) to the controlling unit 2.

The temperature sensor unit 7, the humidity sensor unit 8, and the atmosphere pressure sensor unit 9 serve to detect a temperature, a humidity, and an atmosphere pressure in the vicinity of the action history recording apparatus 1, respectively. The temperature sensor unit 7, the humidity sensor unit 8, and the atmosphere pressure sensor unit 9 are equipped with amplifiers for amplifying signals detected by the respective sensors and A/D converters for converting the detected signals into digital signals. The digital signals (temperature signal, humidity signal, and atmosphere pressure signal) are supplied to the controlling unit 2.

The motion sensor unit 10 serves to detect a movement of the action history recording apparatus 1. The motion sensor unit 10 is equipped with an acceleration sensor for detecting acceleration of the action history recording apparatus 1, an amplifier for amplifying an acceleration signal detected by the acceleration sensor and A/D converter for converting the amplified signal into digital data. The digital data (accelerations in three axial directions) is supplied to the controlling unit 2.

The time counting unit 11 counts a present time, and supplies time data indicating the present time to the controlling unit 2. The time counting unit 11 has a calendar function, and supplied date data to the controlling unit 2, too.

The displaying unit 12 has a liquid crystal displaying panel and a driving circuit. The displaying unit 12 displays an input image, allowing a user to enter a name of a place (location) and so on.

The input unit 13 has a power key and plural keys, which are used by the user to operate the action history recording apparatus 1 and to enter a name of a place, as will be described later. The input unit 13 supplies the controlling unit 2 with a key input signal in response to the user's operation on the input unit 13.

The program/data storing unit 3 serves as storing means such as ROM (Read Only Memory), storing various sorts of programs and data, which are used for the controlling unit 2 (more specifically, CPU) to control the whole operation of the action history recording apparatus 1. In the programs stored in the program/data storing unit 3 is included a program, which is run by the controlling unit 2 to perform a place registering process to be described later.

The user-data storing unit 4 is a rewritable memory. For example, the rewritable memory is a flash drive, which is built-in the action history recording apparatus 1, and/or a detachable memory card, which can be equipped with the action history recording apparatus 1. In the user-data storing unit 4 are stored place specifying data 101 shown in FIG. 2A and action history data 102 shown in FIG. 2B.

Figure 2A:
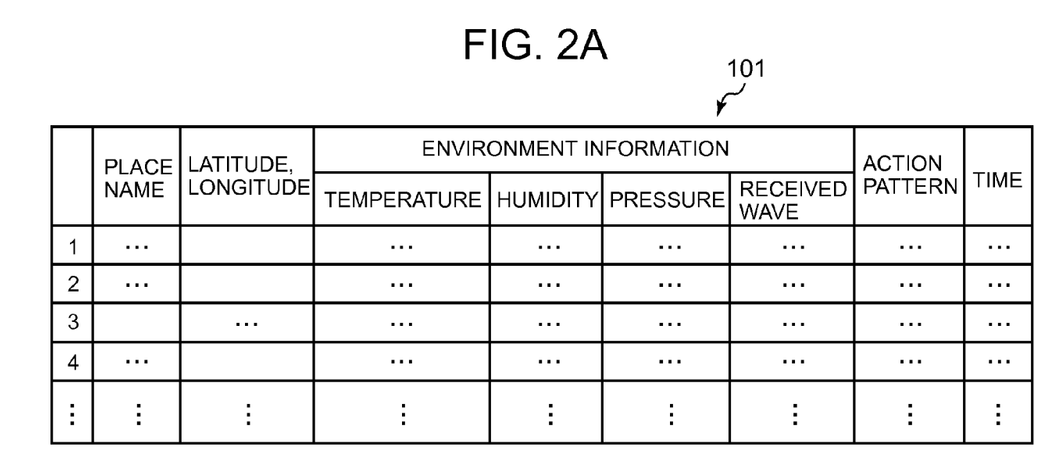
FIG. 2A is a conceptual view of place specifying data.

The place specifying data 101 is data relating to an arbitrary place registered by the user of the action history recording apparatus 1. The place specifying data 101 is stored in the user-data storing unit 4 every time when the controlling unit 2 performs the place registering process, as will be described in detail later.

Each piece of place specifying data 101 consists of a set of data containing the serial number (1, 2, 3, . . . ), either a latitude and longitude or a place name, environment information, an action pattern and a time, as shown in FIG. 2A. The serial number is used to identify one piece of place specifying data 101.

The place name contained in the place specifying data 101 is a name indicating a specific place, entered by the user. The latitude and longitude consist position information for indicating a coordinate of a place on a map that is calculated or measured by GPS unit 5, when the place is registered by the user.

The environment information included in the place specifying data 101 contains information relating to a temperature, a humidity and an atmosphere pressure at an arbitrary place, which are detected by the temperature sensor 7, the humidity sensor 8, and the atmosphere pressure sensor 9, respectively, when the arbitrary place is registered and information relating to an electro-magnetic wave, which is received by the radio signal receiving unit 6, when the arbitrary place is registered. In other words, the environment information is information representing the environment of the vicinity of the action history recording apparatus 1.

The information relating to the electro-magnetic wave received by the radio signal receiving unit 6 is information for indicating a sort of the received electro-magnetic wave and a transmitting source of the electro-magnetic wave. The information for representing the transmitting source indicates MAC address, in the case that the received electro-magnetic wave is to be used for the radio LAN communication, and indicates an access code of the transmitting source, in the case that the received electro-magnetic wave is to be used for Bluetooth communication. Sometimes the place specifying data 101 is used, which contains no information relating to the electro-magnetic wave.

The action pattern contained in the place specifying data 101 is waveform data of acceleration (a series of acceleration data) indicating variations of acceleration respectively in the three axial directions within a predetermined period of time (several seconds), which are detected by the acceleration sensor of the motion sensor unit 10, when the arbitrary place is registered by the user. In the present embodiment of the invention, the series of acceleration data are used as action information, which represents the user's action and also indicates a feature of the user's action in the predetermined period of time (several seconds).

The time information contained in the place specifying data 101 is time data, which is counted by the time counting unit 11, when the arbitrary place is registered by the user.

Figure 2B:
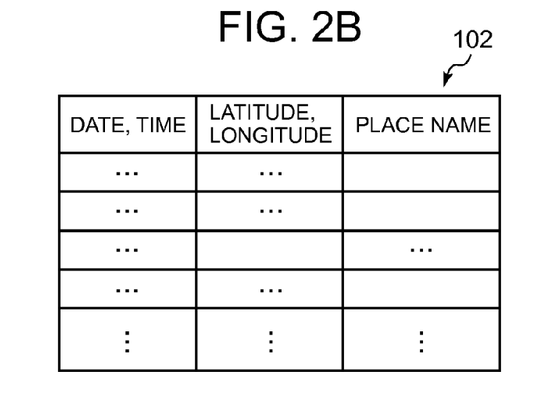
FIG. 2B is a conceptual view of action history data.

The action history data 102 is data representing a history of an action of the user, who brings the action history recording apparatus 1 with him or her. While the controlling unit 2 performs an action history recording process to be described later, the action history data 102 is successively recorded in the user-data storing unit 4, for instance, at certain time intervals.

As shown in FIG. 2B, the action history data 102 consists of a set of data containing date and time and either a latitude and longitude or a place name.

The date and time consisting the action history data 102 is data, which indicates a date (month, day, and year) and a time counted by the time counting unit 11, and the latitude and longitude is position data, which is obtained by GPS unit 5. The place name is a name indicating a specific place, which has been previously registered by the user. The place name is data, which has been stored as the place specifying data 101 at the time when the action history recording apparatus 1 records the action history data 102. In the present embodiment of the invention, the latitude and longitude and the place name are used to indicate a place where the user goes about his or her some action at some point in time.

In the action history recording apparatus 1 having the configuration described above, GPS unit 5 has a function of calculating or measuring a position and the user-data storing unit 4 serves as a memory in the present invention. Further, the radio signal receiving unit 6, the temperature sensor unit 7, the humidity sensor unit 8, the atmosphere pressure sensor unit 9, the motion sensor unit 10, and the time counting unit 11 have functions of obtaining data (an obtaining unit), respectively. The controlling unit 2 runs the program stored in the program/data storing unit 3, thereby working as a similarity judging unit, a place-information obtaining unit, a record controlling unit, an accession judging unit, and an accuracy judging unit. Further, the controlling unit 2 cooperates with the radio signal receiving unit 6 to work as the obtaining unit.

Now, the operation of the action history recording apparatus 1 according to the present invention will be described in detail. When the user performs a predetermined key operation on the action history recording apparatus 1, the controlling unit 2 runs the program stored in the program/data storing unit 3 to perform the place registering process and the action history recording process.

Figure 3:
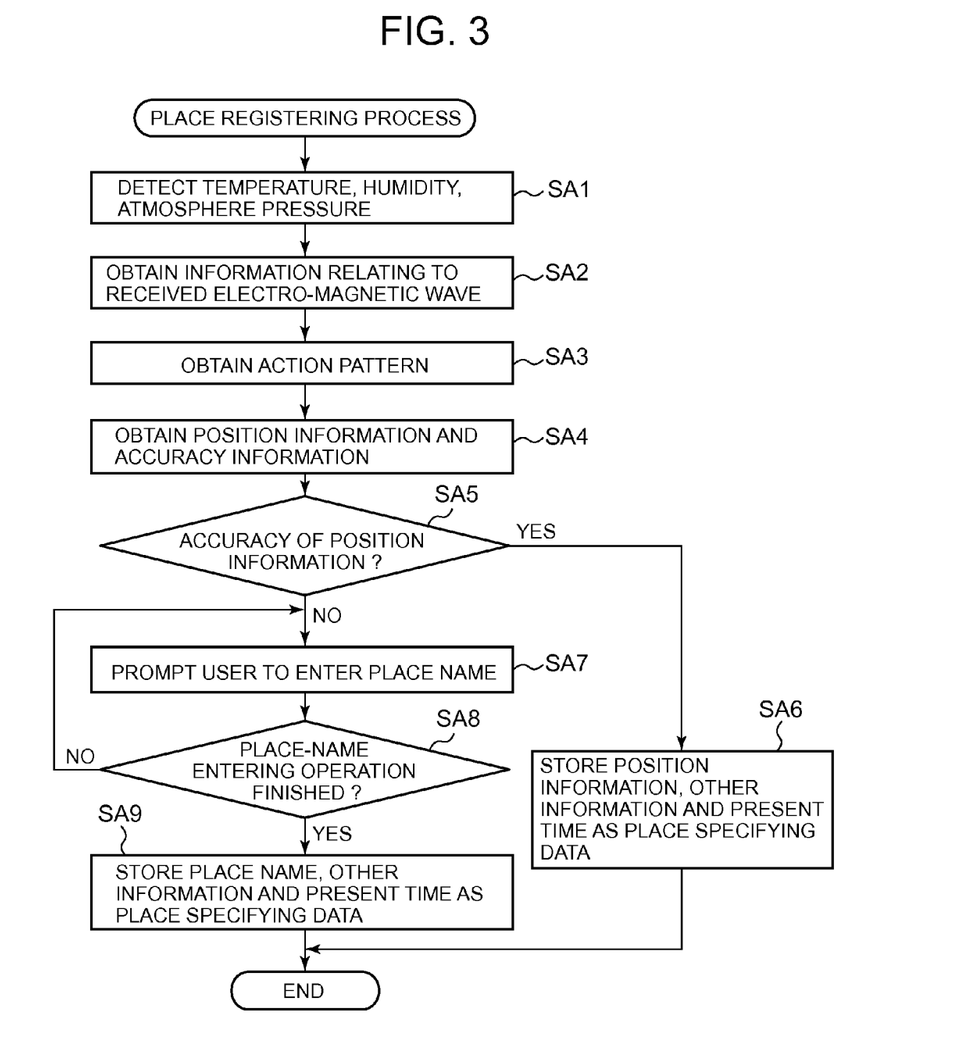
FIG. 3 is a flow chart of a place registering process performed by the controlling unit of the action history recording apparatus.

FIG. 3 is a flow chart of the place registering process to be performed by the controlling unit 2. When the controlling unit 2 starts the place registering process, the temperature sensor unit 7, the humidity sensor unit 8, and the atmosphere pressure sensor unit 9 detect a temperature, a humidity, and an atmosphere pressure, respectively (step SA1).

Then, the controlling unit 2 makes the radio signal receiving unit 6 receive an electro-magnetic wave that is used in a specific communication system, and obtains information relating to the electro-magnetic wave received by the radio signal receiving unit 6 (step SA2). The information relating to the electro-magnetic wave is information for indicating the sort of the received electro-magnetic wave and the transmitting source of the electro-magnetic wave. The information relating the transmitting source indicates MAC address of the transmitting source in the radio LAN communication and/or the access code of the transmitting source in Bluetooth communication.

The controlling unit 2 obtains an action pattern representing the movement of the user who brings the action history recording apparatus 1 with him or her (step SA3). In the process at step SA3, the controlling unit 2 continuously obtains from the motion sensor unit 10 acceleration data in the three axial directions for the predetermined period of time (several seconds), and stores a series of acceleration data (waveform data of acceleration) representing variations in acceleration respectively in the three axial directions as the action pattern in the work memory.

Then, the controlling unit 2 makes GPS unit 5 calculate the present position, and obtains position information (latitude and longitude) indicating the present position of the action history recording apparatus 1 and accuracy information for indicating accuracy of the position information (step SA4).

Thereafter, the controlling unit 2 judges whether or not the accuracy of the position information obtained in the process at step SA4 is higher than a predetermined degree of accuracy (step SA5). When it is determined YES at step SA5, the controlling unit 2 advances to step SA6.

The controlling unit 2 stores the position information obtained in the process at step SA4 and usage-environment information in combination as new place specifying data in the user-data storing unit 4, wherein the usage-environment information includes information obtained in the processes at steps SA1 to SA3 and the present time and the usage-environment information represents the environment, under which the action history recording apparatus 1 is used (step SA6). After performing the process at step SA6, the controlling unit 2 finishes the place registering process.

In the case where the radio signal receiving unit 6 fails in receiving an electro-magnetic wave of the radio LAN communication and/or an electro-magnetic wave of Bluetooth communication in the place registering process, obtaining no information of the received electro-magnetic wave in the process at step SA2, the controlling unit 2 stores in the user-data storing unit 4 place specifying data containing no information of the received electro-magnetic wave in the process at step SA6.

Meanwhile, when it is determined that the accuracy of the position information obtained in the process at step SA4 is not higher than the predetermined degree of accuracy (NO step SA5), the controlling unit 2 displays a previously prepared input image on the displaying unit 12, prompting the user to enter a name (arbitrary name) of a place where the user goes about his or her some action at present (step SA7).

Although not shown in FIG. 3, even in the case where GPS unit 5 fails in calculating the present position in the process at step SA2, obtaining no position information for indicating the present position in the process at step SA4, the controlling unit 2 prompts the user to enter a name (arbitrary name) of a place where the user is goes about some action at present (step SA7).

Thereafter, the controlling unit 2 judges whether or not the user has operated to finish a place-name entering operation (step SA8). When it is determined at step SA8 that the user has operated to finish the place-name entering operation (YES at step SA8), the controlling unit 2 advances to step SA9.

The controlling unit 2 stores the name of a place (place name) entered by the user in combination with usage-environment information obtained in the processes at steps SA1 to SA3 as new place specifying data in the user-data storing unit 4 (step SA9), wherein the usage-environment information includes the present time and the environment information represents the environment, in which the action history recording apparatus 1 is used. After performing the process at step SA9, the controlling unit 2 finishes the place registering process.

In the case where the radio signal receiving unit 6 fails in receiving the electro-magnetic wave of the radio LAN communication and/or the electro-magnetic wave of Bluetooth communication in the place registering process, obtaining no information of the received electro-magnetic wave in the process at step SA2, the controlling unit 2 stores in the user-data storing unit 4 place specifying data containing no information of the received electro-magnetic wave in the process at step SA9.

The place registering process described above can be performed, for example, at predetermined time intervals, or can be automatically performed at predetermined timings. In the case where the place registering process is performed automatically, the process at step SA7 and the following process, in which the user operates to enter a place name can be omitted, and it is possible to automatically generate other names such as a place 1, place 2, place 3, and so on, which can be recognized as a place name and to use these names as place specifying data.

Figure 4:
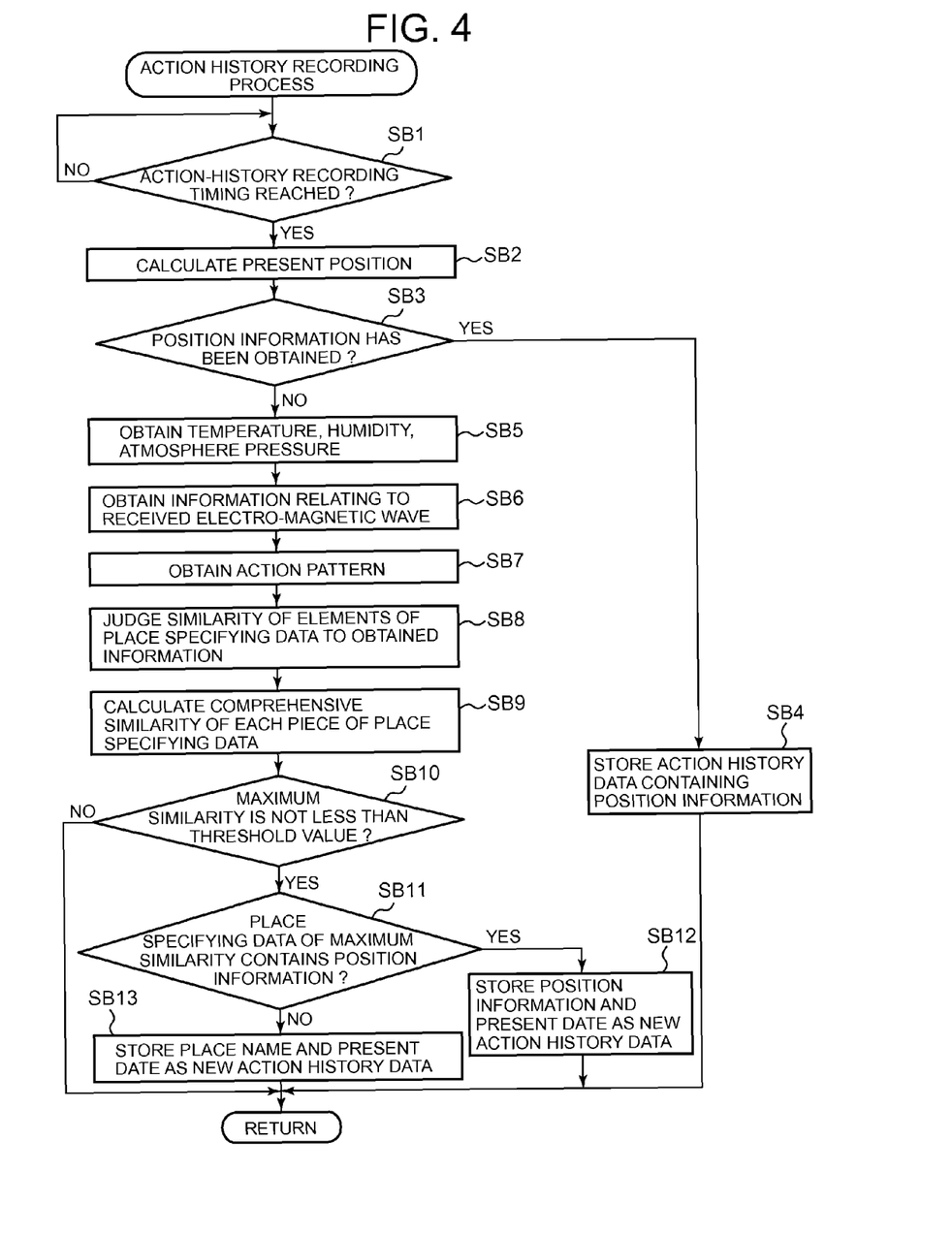
FIG. 4 is a flow chart of an action history recording process performed by the controlling unit of the action history recording apparatus.

Then, the controlling unit 2 performs the action history recording process. FIG. 4 is a flow chart of the action history recording process. In the action history recording process, the controlling unit 2 records an action history at predetermined time intervals and also the controlling unit 2 makes GPS unit 5 calculate or measure the present position every time an action-history recording timing is reached (YES at step SB1), obtaining position information (latitude and longitude) for indicating the present position of the action history recording apparatus 1 (step BS2).

When the position information has been obtained at step SB2 (YES at step BS3), the controlling unit 2 stores action history data containing the obtained position information (step SB4). In other words, the controlling unit 2 stores new action history data containing the obtained position information and the present date in the user-data storing unit 4. Thereafter, the controlling unit 2 returns to step SB1 and stands by until the following action history recording timing reaches.

Meanwhile, when the user bringing the action history recording apparatus 1 with him or her stays within a house and GPS unit 5 of the apparatus 1 fails in calculating the present position because of a poor receiving condition of the electro-magnetic waves from the GPS satellites, obtaining no position information in the process at step SB2 (NO at step BS3), the controlling unit 2 advances to step SB5, where processes similar to those at steps SA1 to SA3 are performed.

More particularly, the controlling unit 2 obtains a temperature, a humidity and an atmosphere pressure in the vicinity of the action history recording apparatus 1 (step SB5), and makes the radio signal receiving unit 6 receive an electro-magnetic wave used in the radio communication of the specific system, thereby obtaining information relating to the electro-magnetic wave received by the radio signal receiving unit 6 (step SB6). Further, the controlling unit 2 obtains an action pattern representing the movement of the user bringing the action history recording apparatus 1 with him or her (step SB7).

The controlling unit 2 judges a similarity of each of elements (an atmosphere pressure, temperature, humidity, information relating to the received electro-magnetic wave, action pattern and a time) contained in the usage-environment information composing each piece of place specifying data 101 stored in the user-data storing unit 4, to corresponding piece of information obtained in the processes at steps SB5 to SB7 and to the present time corresponding to the timing at which the present action history is recorded (step SB8). In the process at step SB8, the controlling unit 2 judges a similarity of each of the elements contained in the usage-environment information on the basis of a judging reference previously determined for each of the elements, thereby finally obtaining a numerical value indicating the degree of similarity.

The controlling unit 2 separately calculates a comprehensive similarity of the usage-environment information with respect to each piece of place specifying data 101 obtained in the process at step SB8 (step SB9). In the process at step SB9, the controlling unit 2 gives predetermined weights respectively to the similarities of the elements composing the usage-environment information, and adds all the weighted similarities of the elements of the usage-environment information, thereby obtaining the comprehensive similarity of the usage-environment information with respect to each piece of place specifying data 101 (step SB9).

When the maximum similarity in each piece of place specifying data 101 is less than a predetermined threshold value (NO at step SB10), the controlling unit 2 performs nothing and returns to step SB1, keeping standing by until the following action history recording timing reaches.

In the process (step SB10) of judging whether the place specifying data 101 has the maximum similarity or not, it is possible to reduce the possibility of determining a place that is accidentally given a high similarity as the present place in error, even though such place having a high similarity is not the true present place, by excluding the place specifying data from those to be judged, which data contains position information that indicates a place separated farther than a predetermined reference distance from a place (reference place) indicated in the position information obtained in the previous position calculation by GPS unit 5 or specified in the place specifying data.

In the case that specific place specifying data is excluded from those to be judged as described above, as a time lapse is set shorter, and/or as the reference distance is set shorter, the possibility of determining the place in error can be reduced further, wherein the time lapse is a time duration lapsed from the time when the reference place is set to the place indicated the position information obtained in the previous position calculation by GPS unit 5 or specified in the place specifying data.

Meanwhile, when the maximum similarity in the place specifying data 101 is not less than the predetermined threshold value (YES at step SB10), the controlling unit 2 advances to step SB11.

In the case that the place specifying data 101 of the maximum similarity contains position information (YES at step SB11), the controlling unit 2 stores position information contained in the place specifying data 101 together with the present date as new action history data in the user-data storing unit 4 (step SB12), and then returns to step SB1, standing by until the following action history recording timing reaches.

In the case that the place specifying data 101 of the maximum similarity contains no position information (YES at step SB11), the controlling unit 2 stores the place name contained in the place specifying data 101 together with the present date as new action history data in the user-data storing unit 4 (step SB13), and then returns to step SB1, standing by until the following action history recording timing reaches.

Thereafter, the controlling unit 2 performs the processes at steps SB2 to SB13 every time when the action history recording timing reaches, thereby successively recording action history data representing the action history of the user.

The action history of the user recorded in the action history recording apparatus 1 in the action history recording process, that is, the action history data 102 stored in the user-data storing unit 4 can be used in any manner. For example, in the case where a detachable memory card is used as the user-data storing unit 4 of the action history recording apparatus 1, the action history data 102 can be used on apparatuses other than the present action history recording apparatus 1, such as personal computers.

In the action history recording process described above, when GPS unit 5 succeeds in calculating the present position, the controlling unit 2 stores position information (latitude and longitude) obtained as the result of the position calculating by GPS unit 5 together with the present date as action history data. In other words, the controlling unit 2 stores the position information obtained as the result of the position calculating by GPS unit 5 as place information (location information) for indicating the place (location) of the user's action, that is, the place (location) where the user went about his or her action.

When GPS unit 5 fails in calculating the present position, the controlling unit 2 obtains the usage-environment information representing the environment, in which the action history recording apparatus 1 is used at the time, that is, the controlling unit 2 obtains the environment information indicating surrounding conditions of the action history recording apparatus 1 and action information representing movements of the user of the action history recording apparatus 1. And the controlling unit 2 stores position information or the place name among those stored previously as the place specifying data 101 as place information representing the place where the user goes about his or her action, wherein the usage environment indicated by plural pieces of stored information corresponding to such position information or place name is similar to the present usage environment to some extent.

Therefore, even though it is hard for the action history recording apparatus 1 to receive the electro-magnetic waves from GPS satellites at a place where the user goes about his or her some action, because of a poor electro-magnetic wave condition, the place of the user's action can be specified under a condition that at least the place of the user's action has been previously registered.

As a result, the user of the action history recording apparatus 1 can record his or her action history including movements in basement, office buildings and so on, where the electro-magnetic waves can be hardly received to calculate a position, in more detail with use of the action history recording apparatus 1.

Further, the action history recording apparatus 1 specifies a place where the electro-magnetic waves cannot be always received from GPS satellites, based on the usage-environment information which is obtained at the present place and the usage-environment information which was previously obtained at the same place and stored as the place specifying data 101. Therefore, the action history recording apparatus 1 can obtain position information, that is, can indicate a position on a different floor in the same building or a position in a different room on the same floor, which is hard or unable for GPS to calculate or specify, as the place of the user's action.

Further, in the place registering process described above, in the case that the controlling unit 2 stores a new place specifying data 101 in the user-data storing unit 4 in response to the user's request at an arbitrary place, when a position could be calculated at the place with a high degree of accuracy, the controlling unit 2 stores position information of the calculated position as the place specifying data 101.

In the case where GPS cannot calculate a position while recording an action history, on the condition that at least the place of the user's action has been previously registered and the position could be calculated at the time when such place was registered, the controlling unit 2 can store the same position information (latitude and longitude) as the position which could be calculated, as place information for indicating the place of the user's action.

Now, modifications to the embodiments of the invention will be described. In the embodiment described above, when the present position cannot be calculated while recording the history of action, the usage-environment information is used for specifying the place of the user's action, which contains environment information indicating an environment, in which the action history recording apparatus 1 is used, action information representing the user's action, and time data. But such usage-environment information can be used, that contains only the environment information indicating an environment, in which the action history recording apparatus 1 is used, that is, the usage-environment information can be used, containing only information relating to a temperature, humidity, atmosphere pressure, and a received electro-magnetic wave.

Specific elements contained in the environment information indicating the environment, in which the action history recording apparatus 1 is used, are not limited to those described hereinabove, but will be changed according to need. For example, the environment information indicating the environment, in which the action history recording apparatus 1 is used, is not always required to include information relating to the received electro-magnetic wave. On the contrary, only the information relating to the received electro-magnetic wave can consist such environment information.

In the embodiment described above, the information relating to the received electro-magnetic wave consists of the information indicating the sort of the received electro-magnetic wave and the transmitting source of the electro-magnetic wave. But, for example, the information indicating either the sort of the received electro-magnetic wave or the transmitting source of the electro-magnetic wave can be used as the information relating to the received electro-magnetic wave. Another information can be used, too.

Arbitrary information, which is affected by other apparatus in the vicinity of the action history recording apparatus 1, can be used as the environment information representing surroundings of the action history recording apparatus 1. For example, noises or sounds coming out from such other apparatus are examples of the arbitrary information.

An arbitrary method may be used in the process of specifying the place of the user's action and in the process of judging the similarity between each piece of usage-environment information previously stored as the place specifying data 101 and usage-environment information obtained at the action history recording timing.

In the action history recording apparatus 1 according to the embodiment of the invention, when the present position can be calculated in the process of recording the history of the user's action, the position information (latitude and longitude) indicating the present position is stored as the action history data. But a modification may be made, such that, when the present position can be calculated in the process of recording the history of the user's action, a name (name of a building, name of an intersection) representing a point on a map is stored as the action history data, in place of the position information (latitude and longitude) indicating the present position.

The action history recording apparatus 1 according to the embodiment of the invention has been described, which has GPS unit 5 for obtaining position information (latitude and longitude) that is basically used as the position information for specifying the place of the user's action (place to which the apparatus 1 has been moved). But the present invention will be used on any other apparatuses, which have a function of specifying a place, to which a moving body is moved (the place of the user's action), even if such apparatuses have no GPS function of calculating a position.

Although the modifications of the present invention and modifications thereto have been described in the above detailed description, it will be understood that rearrangements, substitutions and variations may be made to the disclosed embodiments and modifications while using the features of the invention and remaining within the scope of the invention as defined by the following claims. The claims described in the foregoing description to define the present invention are attached hereto. The following electronic apparatus and method can be composed using the features of the invention.

The electronic apparatus of the present invention is provided with:

a storing unit for storing plural pieces of usage-environment information in combination respectively with plural pieces of place information, wherein the plural pieces of usage-environment information represent environments under which the electronic apparatus is used at different places, respectively and the plural pieces of place information indicate the different places where the electronic apparatus is used, respectively;

an environment-information obtaining unit for obtaining present usage-environment information representing an environment, under which the electronic apparatus is used at present;

a similarity judging unit for judging a similarity of each piece of usage-environment information stored in the storing unit to the present usage-environment information obtained by the environment-information obtaining unit, thereby selecting usage-environment information having a higher similarity from among the plural pieces of usage-environment information stored in the storing unit; and a place-information obtaining unit for obtaining from among the plural pieces of place information stored in the storing unit, specific place information combined with the usage-environment information having a higher similarity, selected by the similarity judging unit as place information indicating a place where the electronic apparatus is used at present.

The storing unit corresponds to the user-data storing unit 4 in the embodiment of the invention, and the functions of the environment-information obtaining unit, the similarity judging unit and the place-information obtaining unit (location-information obtaining unit) are realized by the controlling unit 2 and the program stored in the program/data storing unit 3 in the embodiment of the invention.

The electronic apparatus is further provided with:

a position measuring unit for performing a position measuring operation to obtain position information indicating a present position; and an obtaining-operation judging unit for judging whether or not the position information has been obtained by the position measuring unit, wherein the place-information obtaining unit obtains the position information obtained by the position measuring unit as place information indicating a place where the electronic apparatus is used at present, when the obtaining-operation judging unit determines that the position information has been obtained by the position measuring unit, and the place-information obtaining unit obtains the specific place information combined with the usage-environment information having a higher similarity, in place of the position information to be obtained by the position measuring unit, as place information indicating a place where the electronic apparatus is used at present, when the obtaining-operation judging unit determines that no position information has been obtained by the position measuring unit.

The position measuring unit corresponds to GPS unit 5 in the embodiment of the invention, and the function of the obtaining-operation judging unit is realized by the controlling unit 2 and the program stored in the program/data storing unit 3 in the embodiment of the invention.

The electronic apparatus is further provided with:

a record controlling unit for additionally storing in the storing unit usage-environment information which the environment-information obtaining unit obtains at a position indicated by the position information obtained by the position measuring unit, in combination with place information including said position information, wherein the similarity judging unit judges similarity of the usage-environment information including the usage-environment information and the place information additionally stored in the storing unit by the record controlling unit, and the place-information obtaining unit obtains place information.

The function of the record controlling unit is realized by the controlling unit 2 and the program stored in the program/data storing unit 3 in the embodiment of the invention.

The electronic apparatus is further provided with:

an accuracy judging unit for judging whether or not an accuracy of the position information obtained by the position measuring unit is not lower than a predetermined accuracy, wherein the record controlling unit additionally stores in the storing unit the usage-environment information obtained by the environment-information obtaining unit in combination with place information including the position information obtained by the position measuring unit, when the accuracy judging unit determines that the accuracy of the position information obtained by the position measuring unit is not lower than the predetermined accuracy.

The function of the accuracy judging unit is realized by the controlling unit 2 and the program stored the program/data storing unit 3 in the embodiment of the invention.

The electronic apparatus is further provided with:

an input unit for allowing a user to enter place information, wherein the record controlling unit additionally stores in the storing unit the usage-environment information obtained by the environment-information obtaining unit in combination with place information entered through the input unit, when the accuracy judging unit determines that the accuracy of the position information obtained by the position measuring unit is lower than the predetermined accuracy.

In the electronic apparatus, the environment-information obtaining unit obtains environment information representing an environment of a place were the electronic apparatus is used at present as usage-environment information.

Further, in the electronic apparatus, the environment information obtained by the environment-information obtaining unit contains environment information affected by other apparatus in the vicinity of the electronic apparatus.

In the electronic apparatus, the environment information affected by other apparatus in the vicinity of the electronic apparatus contains information relating to an electro-magnetic wave transferred from other apparatus.

In the electronic apparatus, the environment-information obtaining unit obtains action information together with the environment information as the usage-environment information, wherein the action information represents an action of a user at a present place.

A place specifying method in an electronic apparatus having a storing unit, according to the present invention, the method includes:

a storing step of storing in the storing unit plural pieces of usage-environment information in combination respectively with plural pieces of place information, wherein the plural pieces of usage-environment information represent environments under which the electronic apparatus is used at different places, respectively and the plural pieces of place information indicate the different places where the electronic apparatus is used, respectively;

an environment-information obtaining step of obtaining present usage-environment information representing an environment under which the electronic apparatus is used at present;

a similarity judging step of judging a similarity of each piece of usage-environment information stored in the storing unit to the present usage-environment information obtained at the environment-information obtaining step, thereby selecting usage-environment information having a higher similarity from among the plural pieces of usage-environment information stored in the storing unit; and a place-information obtaining step of obtaining from among the plural pieces of place information stored in the storing unit, specific place information combined with the usage-environment information having a higher similarity, selected at the similarity judging step as place information indicating a place where the electronic apparatus is used at present.

A computer readable recording medium of the present invention, the medium which is to be mounted on an electronic apparatus, wherein the electronic apparatus is provided with a computer for controlling the whole operation of the place-information obtaining apparatus, a storing unit, and the recording medium storing a program, the program, when executed by the computer, to make the computer implement a method for specifying a place, wherein the method comprises:

a storing unit for storing plural pieces of usage-environment information combined respectively with plural pieces of place information, wherein she plural pieces of usage-environment information represent environments under which the electronic apparatus is used at different places, respectively and the plural pieces of place information indicate the different places where the electronic apparatus is used, respectively;

an environment-information obtaining unit for obtaining present usage-environment information representing an environment under which the electronic apparatus is used at present;

a similarity judging unit for judging a similarity of each piece of usage-environment information stored in the storing unit to the present usage-environment information obtained by the environment information obtaining unit, thereby selecting usage-environment information having a higher similarity from among the plural pieces of usage-environment information stored in the storing unit; and a place-information obtaining unit for obtaining from among the plural pieces of place information stored in the storing unit, specific place information combined with the usage-environment information having a higher similarity, selected by the similarity judging unit as place information indicating a place where the electronic apparatus is used at present.

What is claimed is:

1. An electronic apparatus comprising:
    a storing unit for storing plural pieces of usage-environment information in combination respectively with plural pieces of location information, wherein the plural pieces of usage-environment information represent environments in which the electronic apparatus has been used at different locations, respectively, and the plural pieces of location information indicate the different locations where the electronic apparatus has been used, respectively;
    an environment-information obtaining unit for obtaining present usage-environment information representing an environment in which the electronic apparatus is used at present;
    a similarity judging unit for judging a similarity of each piece of usage-environment information stored in the storing unit to the present usage-environment information obtained by the environment-information obtaining unit, and selecting a piece of usage-environment information having a higher similarity from among the plural pieces of usage-environment information stored in the storing unit; and
    a location-information obtaining unit for obtaining from among the plural pieces of location information stored in the storing unit, a specific piece of location information stored in combination with the selected piece of usage-environment information having a higher similarity, as location information indicating a location where the electronic apparatus is used at present.

2. The electronic apparatus according to claim 1, further comprising:
    a position measuring unit for performing a position measuring operation to obtain position information indicating a present position; and
    an obtaining-operation judging unit for judging whether or not the position information has been obtained by the position measuring unit, wherein when the obtaining-operation judging unit determines that the position information has been obtained by the position measuring unit, the location-information obtaining unit obtains the position information obtained by the position measuring unit as the location information indicating the location where the electronic apparatus is used at present, and when the obtaining-operation judging unit determines that no position information has been obtained by the position measuring unit, the location-information obtaining unit obtains the specific piece of location information stored in combination with the selected piece of usage-environment information having a higher similarity, in place of the position information to be obtained by the position measuring unit, as the location information indicating the location where the electronic apparatus is used at present.

3. The electronic apparatus according to claim 2, further comprising:
a record controlling unit for additionally storing in the storing unit usage-environment information which the environment-information obtaining unit obtains at a position indicated by the position information obtained by the position measuring unit, in combination with location information including said position information,
wherein the similarity judging unit judges a similarity of each piece of the usage-environment information including the usage-environment information additionally stored in the storing unit in combination with the location information by the record controlling unit, to the present usage-environment information.

4. The electronic apparatus according to claim 3, further comprising:
an accuracy judging unit for judging whether or not an accuracy of the position information obtained by the position measuring unit is not lower than a predetermined accuracy,
wherein the record controlling unit additionally stores in the storing unit the usage-environment information obtained by the environment-information obtaining unit in combination with the location information including the position information obtained by the position measuring unit, when the accuracy judging unit determines that the accuracy of the position information obtained by the position measuring unit is not lower than the predetermined accuracy.

5. The electronic apparatus according to claim 4, further comprising:
an input unit through which a user can enter location information,
wherein the record controlling unit additionally stores in the storing unit the usage-environment information obtained by the environment-information obtaining unit in combination with location information entered through the input unit, when the accuracy judging unit determines that the accuracy of the position information obtained by the position measuring unit is lower than the predetermined accuracy.

6. The electronic apparatus according to claim 2, wherein the environment-information obtaining unit obtains environment information representing an environment of a location where the electronic apparatus is used at present as usage-environment information.

7. The electronic apparatus according to claim 6, wherein the environment information obtained by the environment-information obtaining unit includes environment information affected by another apparatus in a vicinity of the electronic apparatus.

8. The electronic apparatus according to claim 7, wherein the environment information affected by said another apparatus in the vicinity of the electronic apparatus includes information relating to an electro-magnetic wave transferred from said another apparatus.

9. The electronic apparatus according to claim 8, wherein the environment-information obtaining unit obtains action information together with the environment information as the usage-environment information, wherein the action information represents an action of a user at a present location.

10. The electronic apparatus according to claim 6, wherein the environment-information obtaining unit obtains action information together with the environment information as the usage-environment information, wherein the action information represents an action of a user at a present location.

11. The electronic apparatus according to claim 7, wherein the environment-information obtaining unit obtains action information together with the environment information as the usage-environment information, wherein the action information represents an action of a user at a present location.

12. The electronic apparatus according to claim 1, wherein the environment-information obtaining unit obtains environment information representing an environment of a location where the electronic apparatus is used at present as usage-environment information.

13. The electronic apparatus according to claim 12, wherein the environment information obtained by the environment-information obtaining unit includes environment information affected by another apparatus in a vicinity of the electronic apparatus.

14. The electronic apparatus according to claim 13, wherein the environment information affected by said another apparatus in the vicinity of the electronic apparatus includes information relating to an electro-magnetic wave transferred from said another apparatus.

15. The electronic apparatus according to claim 14, wherein the environment-information obtaining unit obtains action information together with the environment information as the usage-environment information, wherein the action information represents an action of a user at a present location.

16. The electronic apparatus according to claim 12, wherein the environment-information obtaining unit obtains action information together with the environment information as the usage-environment information, wherein the action information represents an action of a user at a present location.

17. The electronic apparatus according to claim 13, wherein the environment-information obtaining unit obtains action information together with the environment information as the usage-environment information, wherein the action information represents an action of a user at a present location.

18. The electronic apparatus according to claim 1, wherein usage-environment information includes environment information representing at least one of a temperature, humidity, and atmosphere pressure of an environment where the usage-environment information is obtained.

19. A location specifying method for an electronic apparatus having a storing unit, the method comprising:
storing in the storing unit plural pieces of usage-environment information in combination respectively with plural pieces of location information, wherein the plural pieces of usage-environment information represent environments in which the electronic apparatus has been used at different locations, respectively, and the plural pieces of location information indicate the different locations where the electronic apparatus has been used, respectively;

obtaining present usage-environment information representing an environment in which the electronic apparatus is used at present;

judging a similarity of each piece of usage-environment information stored in the storing unit to the obtained present usage-environment information, and selecting a piece of usage-environment information having a higher similarity from among the plural pieces of usage-environment information stored in the storing unit; and obtaining from among the plural pieces of place information stored in the storing unit, a piece of specific place information stored in combination with the selected usage-environment information having a higher similarity, as location information indicating a location where the electronic apparatus is used at present.

20. A non-transitory computer readable recording medium that is mountable on an electronic apparatus which comprises a computer for controlling a whole operation of the electronic apparatus, and a storing unit, the recording medium storing a program that is executable by the computer to implement a method for specifying a location, wherein the method comprises:

storing in the storing unit plural pieces of usage-environment information in combination respectively with plural pieces of location information, wherein the plural pieces of usage-environment information represent environments in which the electronic apparatus has been used at different locations, respectively, and the plural pieces of location information indicate the different locations where the electronic apparatus is used, respectively;

obtaining present usage-environment information representing an environment in which the electronic apparatus is used at present;

judging a similarity of each piece of usage-environment information stored in the storing unit to the obtained present usage-environment information, and selecting a piece of usage-environment information having a higher similarity from among the plural pieces of usage-environment information stored in the storing unit; and obtaining from among the plural pieces of location information stored in the storing unit, a specific piece of location information stored in combination with the selected piece of usage-environment information having a higher similarity, as location information indicating a location where the electronic apparatus is used at present.

\* \* \* \* \*